United States Patent
O'Donnell

(10) Patent No.: US 6,266,514 B1
(45) Date of Patent: Jul. 24, 2001

(54) POOR NETWORK COVERAGE MAPPING

(75) Inventor: Owen O'Donnell, Dublin (IE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/186,886

(22) Filed: Nov. 6, 1998

(51) Int. Cl.$^7$ .................................................. H04B 17/00
(52) U.S. Cl. ........................ 455/67.3; 455/456; 455/67.7
(58) Field of Search .................................. 455/510, 522, 455/453, 517, 67.1, 67.3, 456, 457, 423–425, 67.7, 450; 379/32; 370/252

(56) References Cited

U.S. PATENT DOCUMENTS

| | | | |
|---|---|---|---|
| 5,095,500 | * 3/1992 | Tayloe et al. | 379/32 |
| 5,175,867 | 12/1992 | Wejke et al. | 455/33.1 |
| 5,235,633 | 8/1993 | Dennison et al. | 379/60 |
| 5,353,332 | 10/1994 | Raith et al. | 379/59 |
| 5,530,912 | 6/1996 | Agrawal et al. | 455/33.2 |
| 5,546,443 | * 8/1996 | Raith | 379/59 |
| 5,551,058 | 8/1996 | Hutcheson et al. | 455/33.2 |
| 5,561,839 | 10/1996 | Österberg et al. | 455/33.1 |
| 5,640,676 | 6/1997 | Garncarz et al. | 455/33.2 |
| 5,745,523 | 4/1998 | Dent et al. | 375/216 |
| 5,758,264 | * 5/1998 | Bonta et al. | 455/67.7 |
| 5,857,155 | * 1/1999 | Hill et al. | 455/456 |
| 6,072,778 | * 6/2000 | Labedz | 370/252 |
| 6,167,274 | * 12/2000 | Smith et al. | 455/456 |

FOREIGN PATENT DOCUMENTS

| | | |
|---|---|---|
| 0 431 956 | 6/1991 | (EP). |
| 0 602 340 A1 | 6/1994 | (EP). |
| 0 800 319 A1 | 10/1997 | (EP). |
| WO 96/16524 | 5/1996 | (WO). |
| WO 98/19492 | 5/1998 | (WO). |

OTHER PUBLICATIONS

*TEMS–A System for Testing and Monitoring Air Interfaces*; Ericsson Review No. 1; Rikard Lundqvist; pp. 34–44; 1996.

J–O. Lejdal, "CELLO–A Powerful Operations Tool for Trouble–Shooting in Cellular Systems," 38$^{th}$ IEEE, Vehicular Technology Conference: "Telecommunications Freedom—Technology On the Move," (Cat. No. 88CH2622–9), Philadelphia, PA, Jun. 15–17, 1988, pp. 656–658.

* cited by examiner

Primary Examiner—Vivian Chang
Assistant Examiner—John J. Lee
(74) Attorney, Agent, or Firm—Burns, Doane, Swecker & Mathis, L.L.P.

(57) ABSTRACT

A method and system for automatically mapping areas of poor coverage in a cellular network uses signal quality information and mobile station location information. The system constructs a visual map that notes the locations of mobile stations when poor base station-mobile station communication signal quality is reported. The visual map can be used for identifying areas of the network that may require remediation to ensure sufficient network coverage.

56 Claims, 4 Drawing Sheets

POOR NETWORK COVERAGE MAPPING

This application is related to U.S. patent application Ser. No. 09/186623, entitled "Cell Hand-off Border Identification Using MS Positioning and Signal Strength Values," filed Nov. 6, 1998; U.S. patent application Ser. No. 09/186624, entitled "Use of Mobile Locating and Power Control for Radio Network Optimization", filed Nov. 6, 1998; and U.S. patent application Ser. No. 09/186614, entitled "Use of Mobile Station Positioning in Hand-Off," filed Nov. 6, 1998; the disclosures of which are expressly incorporated herein by reference.

BACKGROUND

A mobile phone network conventionally consists of a plurality of base stations arranged in a pattern so as to define a plurality of overlapping cells which provide radiocommunication support in a geographic area. Base stations are located so as to provide optimal coverage of the mobile phone service area. As shown in FIG. 1, the transmission pattern of a geographic arrangement of network base stations typically looks like a honeycomb of cells. Each base station in the network serves a roughly circular area with a diameter ranging from a few hundred meters to several kilometers depending on population density. The mobile phone network typically only has a specified number of frequencies available for use by mobile subscribers. Therefore, to maximize use of the specified number of frequencies while preventing interference between adjacent base stations, each base station supports different frequencies than its corresponding adjacent base stations. When a mobile subscriber moves to the edge of a cell associated with a current servicing base station the mobile subscriber can be "handed-off" to an adjacent base station so as to enable call quality and signal strength to be maintained at a predetermined level.

Occasionally, areas of inadequate network coverage exist within a cell, or between cells, that cannot be circumvented by "hand-off" to a neighboring cell. Examples of such areas (17, 18, 19) are shown in FIG. 1 and typically occur due to geographical terrain, large buildings, or poor cell tuning, for example. These areas of inadequate network coverage can impair the quality of the mobile subscriber signal, and also impair the ability of the network to avoid call dropping. In areas where the transmission level is weak, the quality of the phone signal will likely be degraded. Furthermore, in geographic areas of very poor network coverage, the potential for call dropping exists.

Conventionally, adequate network coverage is monitored through the performance of drive tests by network operator staff. To perform this monitoring, operator staff drive throughout the network and conduct and record call quality checks. A conventional system such as TEMS (Test Mobile System) is used to perform the monitoring. TEMS uses mobiles modified with specialized software for monitoring parameters of the radio environment. Radio environment monitoring is initiated by an operator who connects the modified mobile to a personal computer via a standard RS-232 serial connection. A GPS receiver is also connected to the PC to provide mobile position information. Survey data is then compiled during the monitoring process including data such as the geographic locations associated with signal strengths, bit error rates, interference, or dropped calls. Post-processing of the data gathered by TEMS is performed in a geographical information system (GIS) that enables the operator to visualize survey data with different colors and symbols that are indicative of status and operation of the mobile.

The conventional monitoring technique exemplified by TEMS, however, requires an inordinate amount of resources to survey the network. Such resources include extra monitoring equipment, extra staff to conduct the drive tests, and additional staff time to drive around and survey the network. Furthermore, the time delay between the actual time at which an inadequacy in network coverage begins to exist and the time taken to survey the network, tabulate the results, and implement changes in the network coverage, ensures a period of degraded performance to affected mobile subscribers.

Accordingly, it would be desirable to provide a technique for monitoring a cellular network that minimizes the time required to detect areas of poor network coverage and which further minimizes the necessity of operator intervention.

SUMMARY

These desirable characteristics and others are provided by the following exemplary embodiments of the invention.

According to one exemplary embodiment of the invention a method of constructing a data representation indicating an occurrence of an event associated with a mobile station in a radiocommunications network is provided. The method of this exemplary embodiment comprises the steps of: providing at least one parameter indicating the occurrence of an event associated with said mobile station; comparing said at least one parameter with a plurality of threshold values to provide a comparison result; initiating a positioning request from said network based on said comparison result; providing a location of said mobile station based on said positioning request, wherein said location is associated with the occurrence of said event; and constructing a data representation indicating the occurrence of said event using said plurality of threshold values and said location, wherein said data representation is coded with a value associated with at least one threshold value of said plurality of threshold values.

According to a second exemplary embodiment of the invention a system for constructing a data representation indicating an occurrence of an event associated with a mobile station in a radiocommunications network is provided. The system of this exemplary embodiment comprises: means for providing at least one parameter indicating the occurrence of an event associated with said mobile station; means for comparing said at least one parameter with a plurality of threshold values to provide a comparison result; means for initiating a positioning request from said network based on said comparison result; means for providing a location of said mobile station based on said positioning request, wherein said location is associated with the occurrence of said event; and means for constructing a data representation indicating the occurrence of said event using said plurality of threshold values and said location, wherein said data representation is coded with a value associated with at least one threshold value of said plurality of threshold values.

According to a third exemplary embodiment of the invention a method of constructing a map of events associated with mobile stations in a radiocommunications network is provided. The method of this exemplary embodiment comprises the steps of: a) providing at least one parameter indicating the occurrence of an event associated with a mobile station; b) comparing said at least one parameter with a plurality of threshold values to provide a comparison result; c) initiating a positioning request from said network based on said comparison result; d) providing a location of said mobile station based on said positioning request, wherein said location is associated with the occurrence of said event; e) constructing a data representation indicating the occurrence of said event using said plurality of threshold values and said location, wherein said data representation is coded with a value associated with at least one threshold value of said plurality of threshold values; and f) selectively repeating steps a) through e) to construct a map of occurrences of said events throughout at least a portion of said network.

According to a fourth exemplary embodiment of the invention a system for constructing a map of events associated with mobile stations in a radiocommunications network is provided. The system of this exemplary embodiment comprises: means for providing parameters indicating the occurrences of events associated with a plurality of mobile stations; means for comparing said parameters with a plurality of threshold values to provide comparison results; means for initiating positioning requests from said network based on said comparison results; means for providing locations of each of said plurality of mobile station based on said positioning requests, wherein said locations are associated with said occurrences of events; means for constructing data representations indicating said occurrences of events using said plurality of threshold values and said locations, wherein said data representations are coded with a value associated with at least one threshold value of said plurality of threshold values; and means for constructing a map of said occurrences of events throughout at least a portion of said network.

According to a fifth exemplary embodiment of the invention a method of constructing a map of uplink/downlink signal degradation in a radiocommunications network is provided. The method of this exemplary embodiment comprises the steps of: a) providing at least one parameter indicating signal degradation associated with a location of a mobile station; b) comparing said at least one parameter with a plurality of threshold values to provide a comparison result; c) initiating a positioning request from said network based on said comparison result; d) providing a location of said mobile station based on said positioning request; e) constructing a data representation indicating said signal degradation using said plurality of threshold values and said location, wherein said data representation is coded with a value associated with at least one threshold value of said plurality of threshold values; and f) selectively repeating steps a) through e) to construct a map of signal degradation throughout at least a portion of said network.

According to a sixth exemplary embodiment of the invention a system for constructing a map of uplink/downlink signal degradation in a radiocommunications network is provided. The system of this exemplary embodiment comprises: means for providing parameters indicating the signal degradation associated with locations of a plurality of mobile stations; means for comparing said parameters with a plurality of threshold values to provide comparison results; means for initiating positioning requests from said network based on said comparison results; means for providing said locations of each of said plurality of mobile stations based on said positioning requests; means for constructing data representations indicating said signal degradation using said plurality of threshold values and said locations, wherein said data representation is coded with a value associated with at least one threshold value of said plurality of threshold values; and means for constructing a map of signal degradation throughout at least a portion of said network using said data representations.

BRIEF DESCRIPTION OF THE DRAWINGS

The objects and advantages of the invention will be understood by reading the following detailed description in conjunction with the drawings in which.

DETAILED DESCRIPTION

Figure 2:
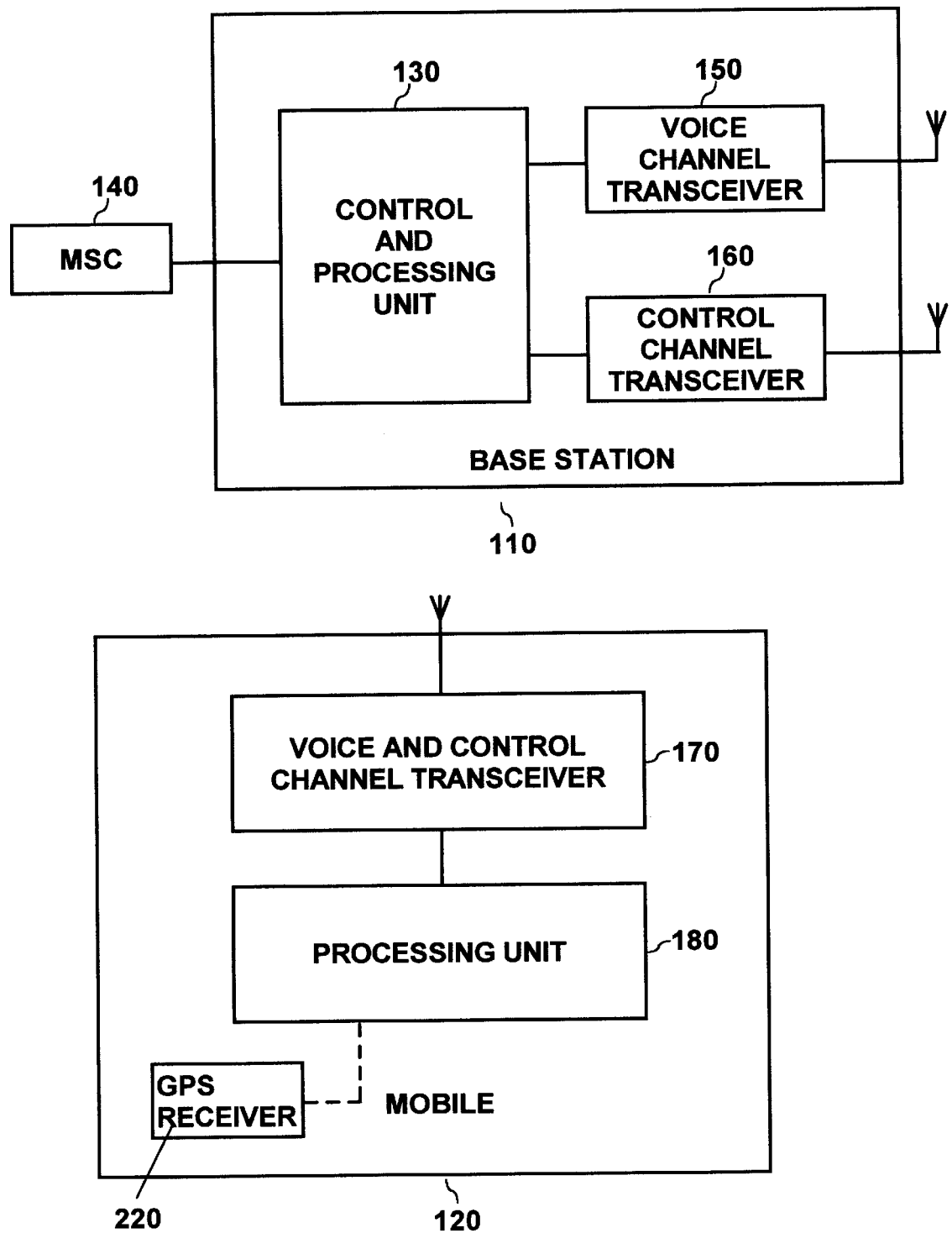
FIG. 2 represents an exemplary implementation of an apparatus for a cellular communications system according to the present invention.

To provide some context within which to describe the present invention consider FIG. 2, which represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System" and U.S. patent application Ser. No. 07/967,027 entitled "Multi-mode Signal Processing," which was filed on Oct. 27, 1992, both of which are incorporated in this application by reference.

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 broadcasts control information over the control channel of the base station or cell to mobiles locked to that control channel. It will be understood that the transceivers 150 and 160 can be implemented as a single device, like the voice and control transceiver 170, for use with digital control channels (DCCHs) and digital traffic channels (DTCs) that share the same radio carrier frequency.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System," which is incorporated in this application by reference.

In accordance with an exemplary embodiment of the invention, shown in FIG. 2, mobile station position update information can be provided by the base station control and processing unit 130. This position update information can be calculated in any desired manner. For example, the processor can use signal strength measurements from at least three base stations to triangulate the mobile station's position or the position can be derived from a GPS receiver 220 located in the mobile station receiver 120. One skilled in the art will recognize, however, that various techniques for determining the location of a mobile station are known in the art, such as, for example, the technique disclosed in European Patent Application EP 0800319A1. If GPS is used to report the mobile station location, the mobile station can transmit position update information ("mobile position report") to the base station 110 in a regular message such as, for example, a conventional IS136 RQL radio quality message which is transmitted at approximately every two seconds. In other positioning methods, however, the actual positioning determination is performed by the network and thus no position data needs to be transmitted over the air interface.

In exemplary embodiments of the invention, the position update information provided at the base station 110 is used in conjunction with radio quality measurements performed at either (or both) the base station or the mobile station (MS) to determine the adequacy of the coverage in a cellular network. If the mobile station performs radio quality measurements, data representations of these measurements are typically transmitted from the mobile station to the base station in messages such as, for example, conventional IS136 RQL radio quality messages. Such quality measurements performed at either the base station or the mobile station can include signal strength, bit error rate, and/or frame error rate.

To monitor the radio quality measurements for updating a network map according to exemplary embodiments of the present invention, supervisory functionality is incorporated into the network. In the exemplary embodiments described below, the supervisory functionality is incorporated into the base station controller (BSC). However, one skilled in the art will recognize that the supervisory functionality could be incorporated into the processor of the mobile switching center (MSC) or a network node separate from either the BSC or the MSC. This functionality supervises the reported measurements and records those measurements which fall below (or above, depending on the quality characteristic being used) one or more specified thresholds. When a reported quality measurement surpasses any of the specified thresholds, the supervisory functionality invokes a positioning function to determine the geographical location from which the measurement was transmitted. The determined geographical location can then be mapped onto a network coverage display to provide a visual representation of the location of deficient radio quality. The supervisory functionality can be selectively activated or deactivated, in regards to the whole network or one or more individual cells, so as to engage or disengage the radio quality mapping in accordance with the requirements of the network operator. This "stop reporting location" mechanism is advantageous in that it reduces the load on the system by suppressing positioning reports from trouble areas that have already been identified.

Figure 3:
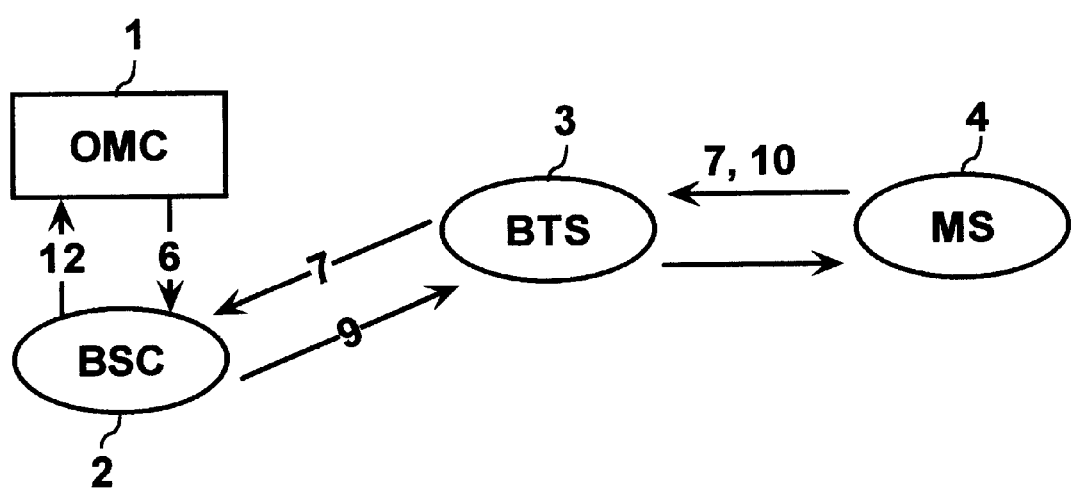
FIG. 3 shows a diagram of a cellular system operating in accordance with exemplary embodiments of the present invention.
Figure 4:
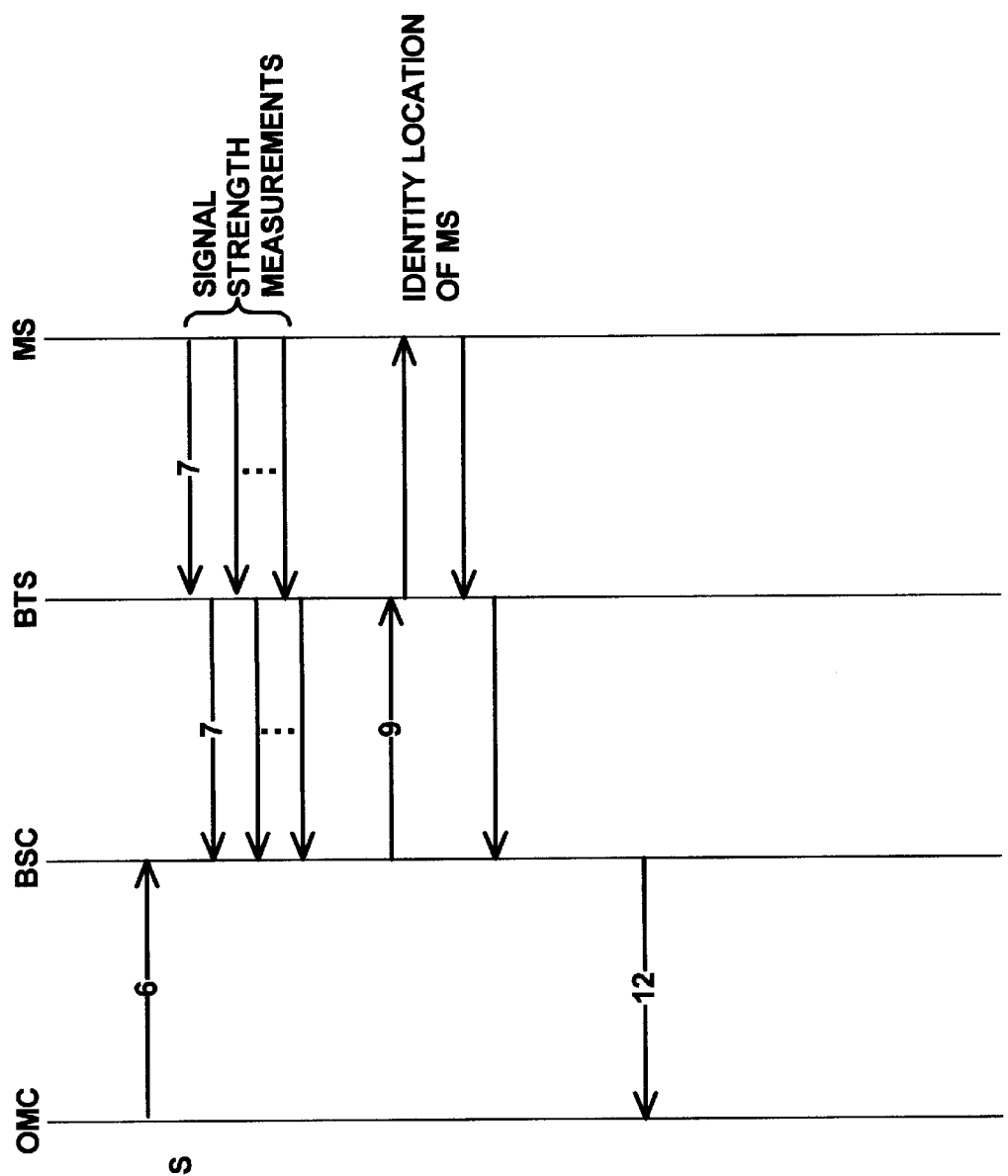
FIG. 4 illustrates a communication diagram according to exemplary embodiments of the present invention.

In the exemplary embodiment shown in FIGS. 3 and 4, one or more quality characteristic threshold levels are set 5 in the operations and maintenance center (OMC) 1. Additionally, different quality characteristic threshold values can be specified for different cells. Using this technique, the threshold values can thus be adjusted to account for radio environments that differ from cell to cell. Also, by setting lower threshold values in important "hot spot" cells, this technique serves to better identify weak areas in network coverage in these important cells. Conversely, cells of lesser importance or cells with known coverage deficiency, can have their associated thresholds increased so as to reduce the processing load on the system.

As described below in more detail, two or more different thresholds can be used to identify different levels of signal degradation on the network map. These levels are then sent 6 to the prescribed base station controllers (BSC) 2 to be implemented within the supervisory functionality of the present invention. The mobile stations 4 transmit quality measurements 7 to the BSC via the base transceiver station (BTS) 3. The BSC then compares these quality characteristics against the specified threshold levels 8:

$$SS_{meas} < t_{h1} \quad BER_{meas} > t_{h1} \qquad 1)$$

$$SS_{meas} < t_{h2} \quad BER_{meas} > t_{h2} \qquad 2)$$

When the quality measure falls below (or above) any of the specified thresholds, the BSC invokes the positioning 8 which then requests the identity and geographic location of the associated mobile station 9. In response to this request, the mobile station transmits location information 10 to the BSC, in an exemplary embodiment wherein the mobile station includes a GPS receiver or some other locating mechanism. Alternatively, if the positioning function 8 is performed by network components, e.g., base stations employing triangulation, then the positioning function 8 requests the mobile station's current position from the system. The BSC then compiles the mobile station identification (including mobile manufacturer), signal quality, cell identification, and mobile station location information 11 and transmits the information 12 to the OMC. A processor at the OMC operates upon the received data to construct a visual representation that indicates 13 the location and the signal quality level at that location.

Figure 1:
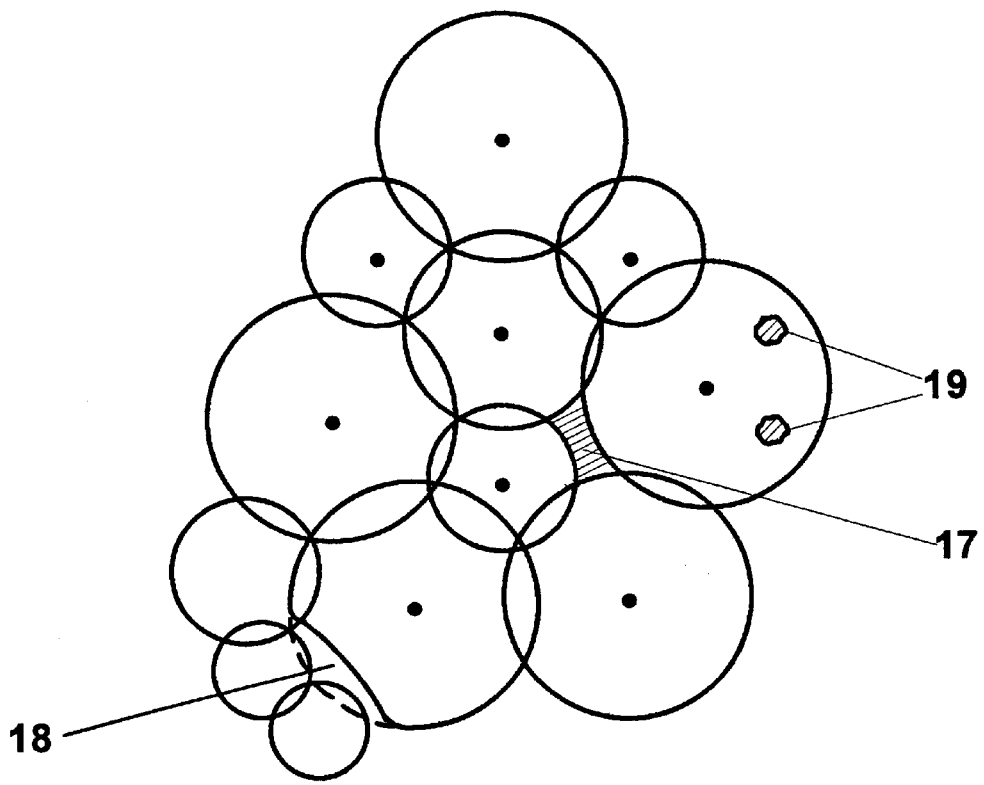
FIG. 1 is a diagram of overlapping cells in a mobile phone network.
Figure 5:
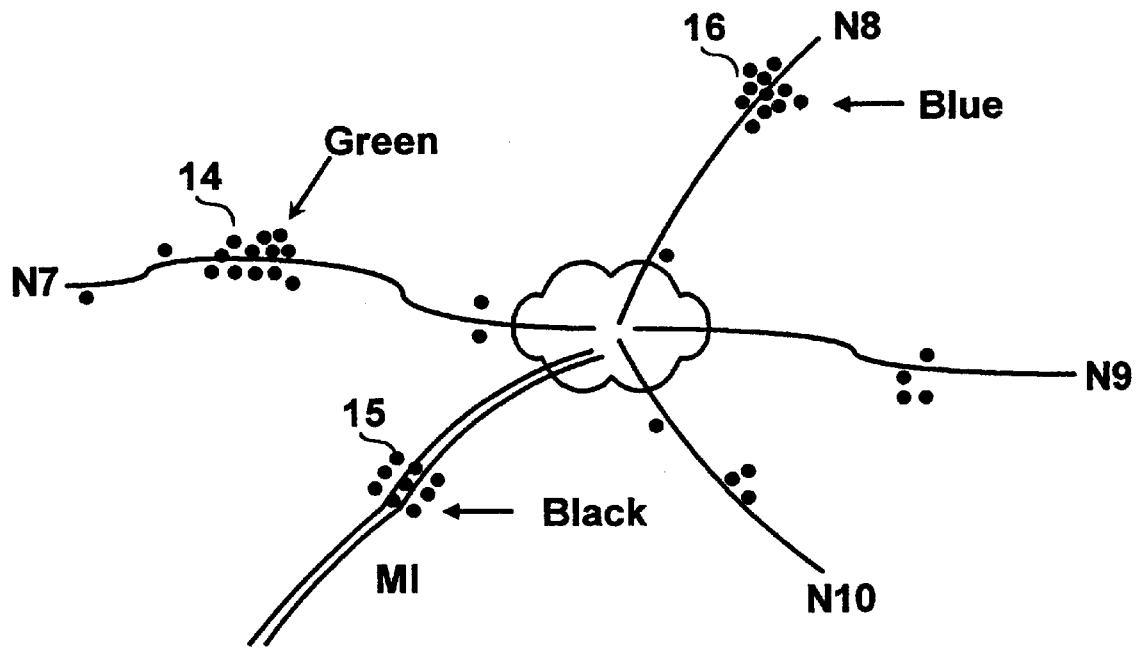
FIG. 5 shows a network map indicating areas of deficient network coverage according to exemplary embodiments of the invention.

The OMC processor translates the different measured quality levels into different colored visual representations that correspond to the surpassed threshold levels. For example, a signal strength that is less than $t_{h1}$ (relation 1) above) could be represented as a green pixel or dot to indicate a weak signal. A signal strength that is less than $t_{h2}$ (relation 2) above) could be represented as a blue pixel or dot to indicate a very weak signal. Over a period of time, a series of dots will accumulate in an area that is inadequately covered by the network. As the geographic illustration in FIG. 5 shows, an accumulation of green dots 14 or blue dots 16 will clearly indicate areas of weak or very weak network coverage. Furthermore, the technique of color coding could be used to show the level of signal degradation encountered by the mobile station as the mobile station traverses the network map. Thus, using this technique, only one pixel would be associated with a given mobile station and the pixel would move on the visual representation of the network map as the mobile station moves, and may or may not change color as the pixel moves, depending on the level of signal degradation that is encountered.

In another exemplary embodiment of the invention, the technique described above can be extended to include the mapping of dropped calls (calls that abruptly lose their connection). When a call to a mobile subscriber is dropped by the network in mid-conversation the mobile station usually is still capable of signaling the network. Additional functionality can thus be implemented in the BSC to identify these abnormally terminated calls. When these calls are identified, the positioning function in the BSC can be invoked to determine the geographic location of the mobile associated with the dropped call. Similar to the previous embodiment, this location can be transmitted to the OMC and there incorporated into the visual representation as, for example, a black dot. Accumulation of a number of dots associated with dropped calls (15, FIG. 5) will indicate a problem area to the operator that will require immediate investigation.

The technique described above can further be extended to include the mapping of mobile station locations at hand-off requests. A hand-off request associated with a mobile station is typically based on uplink and/or downlink signal quality measurements. These signal quality measurements can be, for example, bit error rate and/or signal strength. When quality measurements for a communication signal between a given base station and mobile station reach specified levels a hand-off request is initiated. In this exemplary embodiment of the invention, initiation of a hand-off request invokes the positioning function in the BSC to determine the geographic location of the mobile station associated with the hand-off request. This location can, similar to dropped calls discussed above, then be incorporated into a representation of a network map.

The different colored visual representations shown in FIG. 5 can be used by the system operator for network coverage maintenance and cell planning. Thus, a weak signal representation ("green", FIG. 5) indicates to the system operator that the associated area of the network may require further monitoring. A very weak signal representation ("blue", FIG. 5) indicates to the system operator that a more detailed investigation is required, such as deploying a Test Mobile System (TEMS) to the area. A dropped call representation ("black", FIG. 5) further can indicate to the system operator that repairs to the system are required and that repair personnel should be dispatched.

Exemplary embodiments of the invention thus provide desirable techniques for automatically mapping areas of poor coverage in a cellular network. Using mobile station positioning information, a visual map can be constructed for viewing in the operations and maintenance center that permits real time identification of areas of the network that may require remediation. These techniques are advantageous in that they require minimal loading on current systems (i.e., provision of MS location data) and permit a reduction in resources and man-hours that were previously required to manually survey the network.

Although a number of embodiments are described herein for purposes of illustration, these embodiments are not meant to be limiting. Those skilled in the art will recognize modifications that can be made in the illustrated embodiment. Such modifications are meant to be covered by the spirit and scope of the appended claims.

What is claimed is:

1. A method of constructing a data representation indicating an occurrence of an event associated with a mobile station in a radiocommunications network, comprising the steps of:
    providing at least one parameter indicating the occurrence of an event associated with said mobile station;
    comparing said at least one parameter with a plurality of threshold values to provide a comparison result;
    initiating a positioning request from said network based on said comparison result;
    providing a location of said mobile station based on said positioning request, wherein said location is associated with the occurrence of said event; and
    constructing a data representation indicating the occurrence of said event using said plurality of threshold values and said location, wherein said data representation is coded with a value associated with at least one threshold value of said plurality of threshold values.

2. The method of claim 1, wherein said coded value represents color.

3. The method of claim 1, wherein said comparison result indicates whether said at least one parameter satisfies a specified relation with at least one of said plurality of threshold values.

4. The method of claim 1, wherein said at least one parameter includes signal quality.

5. The method of claim 4, wherein said signal quality parameter is signal strength.

6. The method of claim 4, wherein said signal quality parameter is bit error rate.

7. The method of claim 4, wherein said signal quality parameter is frame error rate.

8. The method of claim 1, wherein at least one of said parameters is transmitted over a radio communications channel.

9. The method of claim 1, wherein said event is an occurrence of a dropped call from said mobile station.

10. The method of claim 1, wherein said step of comparing is selectively omitted so as to disengage said method of constructing a data representation.

11. The method of claim 1, wherein said plurality of threshold values can be specified differently for different portions of said network.

12. The method of claim 11, wherein said different portions comprise different cells of said network.

13. The method of claim 1, wherein the plurality of threshold values is lower if a cell is a hot spot cell.

14. The method of claim 1, wherein the plurality of threshold values are adjusted based on a radio environment of the cell.

15. A system for constructing a data representation indicating an occurrence of an event associated with a mobile station in a radiocommunications network, comprising:
    means for providing at least one parameter indicating the occurrence of an event associated with said mobile station;
    means for comparing said at least one parameter with a plurality of threshold values to provide a comparison result;
    means for initiating a positioning request from said network based on said comparison result;
    means for providing a location of said mobile station based on said positioning request, wherein said location is associated with the occurrence of said event; and
    means for constructing a data representation indicating the occurrence of said event using said plurality of threshold values and said location, wherein said data representation is coded with a value associated with at least one threshold value of said plurality of threshold values.

16. The system of claim 15, wherein said coded value represents color.

17. The system of claim 15, wherein said comparison result indicates whether said at least one parameter satisfies a specified relation with at least one of said plurality of threshold values.

18. The system of claim 15, wherein said at least one parameter includes signal quality.

19. The system of claim 18, wherein said signal quality parameter is signal strength.

20. The system of claim 18, wherein said signal quality parameter is bit error rate.

21. The system of claim 18, wherein said signal quality parameter is frame error rate.

22. The system of claim 15, wherein at least one of said parameters is transmitted over a radio communications channel.

23. The system of claim 15, wherein said event is an occurrence of a dropped call from said mobile station.

24. The system of claim 15, wherein said means for comparing is selectively deactivated so as to disengage said means for constructing a data representation.

25. The method of claim 15, wherein said plurality of threshold values can be specified differently for different portions of said network.

26. The method of claim 15, wherein said different portions comprise different cells of said network.

27. The method of claim 15, wherein the plurality of threshold values is lower if a cell is a hot spot cell.

28. The method of claim 15, wherein the plurality of threshold values are adjusted based on a radio environment of the cell.

29. A method of constructing a map of events associated with mobile stations in a radiocommunications network, comprising the steps of:
   a) providing at least one parameter indicating the occurrence of an event associated with a mobile station;
   b) comparing said at least one parameter with a plurality of threshold values to provide a comparison result;
   c) initiating a positioning request from said network based on said comparison result;
   d) providing a location of said mobile station based on said positioning request, wherein said location is associated with the occurrence of said event;
   e) constructing a data representation indicating the occurrence of said event using said plurality of threshold values and said location, wherein said data representation is coded with a value associated with at least one threshold value of said plurality of threshold values; and
   f) selectively repeating steps a) through e) to construct a map of occurrences of said events throughout at least a portion of said network.

30. The method of claim 29, wherein said coded value represents color.

31. The method of claim 29, wherein said comparison result indicates whether said at least one parameter satisfies a specified relation with at least one of said plurality of threshold values.

32. The method of claim 29, wherein said at least one parameter includes signal quality.

33. The method of claim 32, wherein said signal quality parameter is signal strength.

34. The method of claim 32, wherein said signal quality parameter is bit error rate.

35. The method of claim 32, wherein said signal quality parameter is frame error rate.

36. The method of claim 29, wherein at least one of said parameters is transmitted over a radio communications channel.

37. The method of claim 29, wherein said event is an occurrence of a dropped call from said mobile station.

38. The method of claim 29, wherein said step of comparing is selectively omitted so as to disengage said method of constructing a map of events for at least a portion of said network.

39. The method of claim 29, wherein said plurality of threshold values can be specified differently for different portions of said network.

40. The method of claim 29, wherein said different portions comprise different cells of said network.

41. A system for constructing a map of events associated with mobile stations in a radiocommunications network, comprising:
   means for providing parameters indicating the occurrences of events associated with a plurality of mobile stations;
   means for comparing said parameters with a plurality of threshold values to provide comparison results;
   means for initiating positioning requests from said network based on said comparison results;
   means for providing locations of each of said plurality of mobile station based on said positioning requests, wherein said locations are associated with said occurrences of events;
   means for constructing data representations indicating said occurrences of events using said plurality of threshold values and said locations, wherein said data representations are coded with a value associated with at least one threshold value of said plurality of threshold values; and
   means for constructing a map of said occurrences of events throughout at least a portion of said network using said constructed data representations.

42. The system of claim 41, wherein said coded value represents color.

43. The system of claim 41, wherein said comparison results indicate whether said parameters satisfy a specified relation with at least one of said plurality of threshold values.

44. The system of claim 41, wherein said parameters include signal quality.

45. The system of claim 44, wherein said signal quality parameters are signal strength.

46. The system of claim 44, wherein said signal quality parameters are bit error rate.

47. The system of claim 44, wherein said signal quality parameters are frame error rate.

48. The system of claim 41, wherein said parameters are transmitted over radio communication channels.

49. The system of claim 41, wherein said events are occurrences of dropped calls from said plurality of mobile stations.

50. The system of claim 41, wherein said means for comparing is selectively deactivated so as to disengage said means for constructing a map for at least a portion of said network.

51. The method of claim 41, wherein said plurality of threshold values can be specified differently for different portions of said network.

52. The method of claim 51, wherein said different portions comprise different cells of said network.

53. A method of constructing a map of uplink/downlink signal degradation in a radiocommunications network, comprising the steps of:
   a) providing at least one parameter indicating signal degradation associated with a location of a mobile station;
   b) comparing said at least one parameter with a plurality of threshold values to provide a comparison result;
   c) initiating a positioning request from said network based on said comparison result;

d) providing a location of said mobile station based on said positioning request;

e) constructing a data representation indicating said signal degradation using said plurality of threshold values and said location, wherein said data representation is coded with a value associated with at least one threshold value of said plurality of threshold values; and f) selectively repeating steps a) through e) to construct a map of signal degradation throughout at least a portion of said network.

54. A system for constructing a map of uplink/downlink signal degradation in a radiocommunications network comprising:

means for providing parameters indicating the signal degradation associated with locations of a plurality of mobile stations;

means for comparing said parameters with a plurality of threshold values to provide comparison results;

means for initiating positioning requests from said network based on said comparison results;

means for providing said locations of each of said plurality of mobile stations based on said positioning requests;

means for constructing data representations indicating said signal degradation using said plurality of threshold values and said locations, wherein said data representation is coded with a value associated with at least one threshold value of said plurality of threshold values; and means for constructing a map of signal degradation throughout at least a portion of said network using said data representations.

55. A method of constructing a data representation indicating an occurrence of an event associated with a mobile station in a radiocommunications network, comprising the steps of:

providing at least one parameter indicating the occurrence of an event associated with said mobile station;

comparing said at least one parameter with a plurality of threshold values to provide a comparison result, wherein said plurality of threshold values are different for different portions of said network;

initiating a positioning request from said network based on said comparison result;

providing a location of said mobile station based on said positioning request, wherein said location is associated with the occurrence of said event; and constructing a data representation indicating the occurrence of said event using said plurality of threshold values and said location, wherein said data representation is coded with a value associated with at least one threshold value of said plurality of threshold values.

56. A system for constructing a data representation indicating an occurrence of an event associated with a mobile station in a radiocommunications network, comprising:

means for providing at least one parameter indicating the occurrence of an event associated with said mobile station;

means for comparing said at least one parameter with a plurality of threshold values to provide a comparison result, wherein said plurality of threshold values are different for different portions of said network;

means for initiating a positioning request from said network based on said comparison result;

means for providing a location of said mobile station based on said positioning request, wherein said location is associated with the occurrence of said event; and means for constructing a data representation indicating the occurrence of said event using said plurality of threshold values and said location, wherein said data representation is coded with a value associated with at least one threshold value of said plurality of threshold values.

* * * * *